US011966192B2

(12) United States Patent
Sato

(10) Patent No.: US 11,966,192 B2
(45) Date of Patent: Apr. 23, 2024

(54) IMAGE FORMING APPARATUS

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/313,422

(22) Filed: May 8, 2023

(65) Prior Publication Data

US 2023/0273568 A1 Aug. 31, 2023

Related U.S. Application Data

(63) Continuation of application No. 18/047,338, filed on Oct. 18, 2022, now Pat. No. 11,669,041, which is a (Continued)

(30) Foreign Application Priority Data

Aug. 23, 2018 (JP) ................................ 2018-156470

(51) Int. Cl.
*G03G 21/18* (2006.01)
*G03G 21/10* (2006.01)
*G03G 21/12* (2006.01)

(52) U.S. Cl.
CPC ............. *G03G 21/18* (2013.01); *G03G 21/10* (2013.01); *G03G 21/105* (2013.01); *G03G 21/12* (2013.01);
(Continued)

(58) Field of Classification Search
CPC ...... G03G 21/18; G03G 21/10; G03G 21/105; G03G 21/12; G03G 21/1803;
(Continued)

(56) References Cited

U.S. PATENT DOCUMENTS 5,289,249 A 2/1994 Yamamoto et al.
10,705,479 B2 * 7/2020 Sato .................. G03G 21/1821
(Continued)

FOREIGN PATENT DOCUMENTS

EP 0249928 A2 12/1987
EP 756216 A2 1/1997
(Continued)

OTHER PUBLICATIONS

Office Action (Notice of Reasons for Refusal) issued in corresponding Japanese Patent Application No. 2018-156470, dated Jul. 5, 2022.

*Primary Examiner* — Ryan D Walsh
(74) *Attorney, Agent, or Firm* — Merchant & Gould P.C.

(57) ABSTRACT

A first side frame is apart from a second side frame in a first direction. A photosensitive drum is rotatable about a drum axis extending in the first direction. The photosensitive drum is rotatably supported between the first side frame and the second side frame. A grip portion extends in the first direction. A first connector extends in a second direction perpendicular to the first direction. The first connector connects the first side frame and a first end portion of the grip portion. The second connector extends in the second direction. The second connector connects the second side frame and a second end portion of the grip portion. A scanner unit is configured to expose the photosensitive drum to light. The scanner unit is located between the photosensitive drum and the grip portion as viewed in a third direction which is perpendicular to the first and second directions.

12 Claims, 11 Drawing Sheets

Related U.S. Application Data continuation of application No. 17/371,249, filed on Jul. 9, 2021, now Pat. No. 11,526,121, which is a continuation of application No. 16/892,416, filed on Jun. 4, 2020, now Pat. No. 11,061,361, which is a continuation of application No. 16/460,186, filed on Jul. 2, 2019, now Pat. No. 10,705,479.

(52) U.S. Cl.
CPC ..... *G03G 21/1803* (2013.01); *G03G 21/1817* (2013.01); *G03G 21/1821* (2013.01); *G03G 21/1842* (2013.01); *G03G 21/1846* (2013.01); *G03G 21/1853* (2013.01); *G03G 2221/183* (2013.01); *G03G 2221/1846* (2013.01); *G03G 2221/1884* (2013.01)

(58) Field of Classification Search
CPC ........... G03G 21/1817; G03G 21/1821; G03G 21/1842; G03G 21/1846; G03G 21/1853; G03G 2221/183; G03G 2221/1846; G03G 2221/1884
See application file for complete search history.

(56) References Cited

U.S. PATENT DOCUMENTS

| | | | | |
|---|---|---|---|---|
| 10,962,918 | B2 | 3/2021 | Nakayashiki | |
| 11,061,361 | B2 * | 7/2021 | Sato | G03G 21/1817 |
| 11,526,121 | B2 * | 12/2022 | Sato | G03G 21/105 |
| 11,669,041 | B2 * | 6/2023 | Sato | G03G 21/1821 399/111 |
| 2002/0181968 | A1 | 12/2002 | Okimura et al. | |
| 2007/0154236 | A1 | 7/2007 | Kwon | |
| 2008/0063427 | A1 | 3/2008 | Ikado et al. | |
| 2010/0239304 | A1 | 9/2010 | Sato et al. | |
| 2012/0114385 | A1 | 5/2012 | Tsumita | |
| 2014/0153971 | A1 | 6/2014 | Swantner et al. | |
| 2015/0050042 | A1 | 2/2015 | Sato et al. | |
| 2015/0050044 | A1 | 2/2015 | Sato | |
| 2016/0209776 | A1 | 7/2016 | Akaike et al. | |
| 2017/0102641 | A1 | 4/2017 | Sato | |
| 2017/0219960 | A1 | 8/2017 | Sato | |
| 2017/0269539 | A1 | 9/2017 | Komiyama et al. | |
| 2017/0285566 | A1 | 10/2017 | Shimizu et al. | |
| 2018/0095418 | A1 | 4/2018 | Sato et al. | |
| 2018/0107153 | A1 | 4/2018 | Sato et al. | |
| 2018/0284649 | A1 | 10/2018 | Minoshima et al. | |
| 2021/0063949 | A1 | 3/2021 | Sato et al. | |
| 2021/0063958 | A1 | 3/2021 | Taugchi et al. | |
| 2021/0141335 | A1 | 5/2021 | Maeta et al. | |
| 2021/0333748 | A1 | 10/2021 | Sato | |
| 2022/0404737 | A1 | 12/2022 | Fujii et al. | |

FOREIGN PATENT DOCUMENTS

| | | | | |
|---|---|---|---|---|
| JP | 3263388 | B2 * | 3/2002 | G03G 21/181 |
| JP | 2007-193369 | A | 8/2007 | |
| JP | 2010-217774 | A | 9/2010 | |
| JP | 2013-231818 | A | 11/2013 | |
| JP | 2014071294 | A | 4/2014 | |
| JP | 2015-197518 | A | 11/2015 | |
| JP | 2017-72704 | A | 4/2017 | |
| JP | 2017-182012 | A | 10/2017 | |
| WO | 2013/028156 | A1 | 2/2013 | |
| WO | 2020/022585 | A1 | 1/2020 | |

* cited by examiner

IMAGE FORMING APPARATUS

REFERENCE TO RELATED APPLICATIONS

This application is a continuation of U.S. patent application Ser. No. 18/047,338, filed Oct. 18, 2022, which is a continuation of U.S. patent application Ser. No. 17/371,249, filed Jul. 9, 2021, now U.S. Pat. No. 11,526,121, which is a continuation of U.S. patent application Ser. No. 16/892,416, filed Jun. 4, 2020, now U.S. Pat. No. 11,061,361, which is a continuation of U.S. patent application Ser. No. 16/460,186, filed Jul. 2, 2019, now U.S. Pat. No. 10,705,479, which claims priority from Japanese Patent Application No. 2018-156470 filed Aug. 23, 2018. The entire contents of the aforementioned applications are incorporated herein by reference.

BACKGROUND ART

Technical Field

This disclosure relates to an image forming apparatus including a process cartridge, a scanner unit, and a toner cartridge.

Background

An image forming apparatus is conventionally known. The image forming apparatus includes a process cartridge having a photosensitive drum, a scanner unit that exposes the photosensitive drum, and a toner cartridge that stores toner. In this image forming apparatus, the toner cartridge is disposed below the scanner unit.

DESCRIPTION

Summary

According to one aspect, this specification discloses an image forming apparatus. The image forming apparatus includes a process cartridge and a scanner unit. The process cartridge includes a first side frame, a second side frame, a photosensitive drum, a grip portion, a first connector, and a second connector. The second side frame is apart from the first side frame in a first direction. The photosensitive drum is rotatable about a drum axis extending in the first direction. The photosensitive drum is rotatably supported between the first side frame and the second side frame. The grip portion extends in the first direction. The first connector extends in a second direction being perpendicular to the first direction. The first connector connects the first side frame and a first end portion of the grip portion. The second connector extends in the second direction. The second connector connects the second side frame and a second end portion of the grip portion. The scanner unit is configured to expose the photosensitive drum to light. The scanner unit is located between the photosensitive drum and the grip portion as viewed in a third direction which is perpendicular to the first direction and the second direction.

According to another aspect, this specification discloses an image forming apparatus. The image forming apparatus includes a toner cartridge, a process cartridge, and a scanner unit. The toner cartridge stores toner. The process cartridge includes a first side frame, a second side frame, a photosensitive drum, a grip portion, a first connector, and a second connector. The second side frame is apart from the first side frame in a first direction. The photosensitive drum is rotatable about a drum axis extending in the first direction. The photosensitive drum is rotatably supported between the first side frame and the second side frame. The grip portion extends in the first direction. The first connector extends in a second direction being perpendicular to the first direction. The first connector connects the first side frame and a first end portion of the toner cartridge. The second connector extends in the second direction. The second connector connects the second side frame and a second end portion of the toner cartridge. The scanner unit is configured to expose the photosensitive drum to light. The scanner unit is located between the first connector and the second connector as viewed in a third direction which is perpendicular to the first direction and the second direction.

BRIEF DESCRIPTION OF THE DRAWINGS

Embodiments in accordance with this disclosure will be described in detail with reference to the following figures wherein.

DETAILED DESCRIPTION

Figure 1:
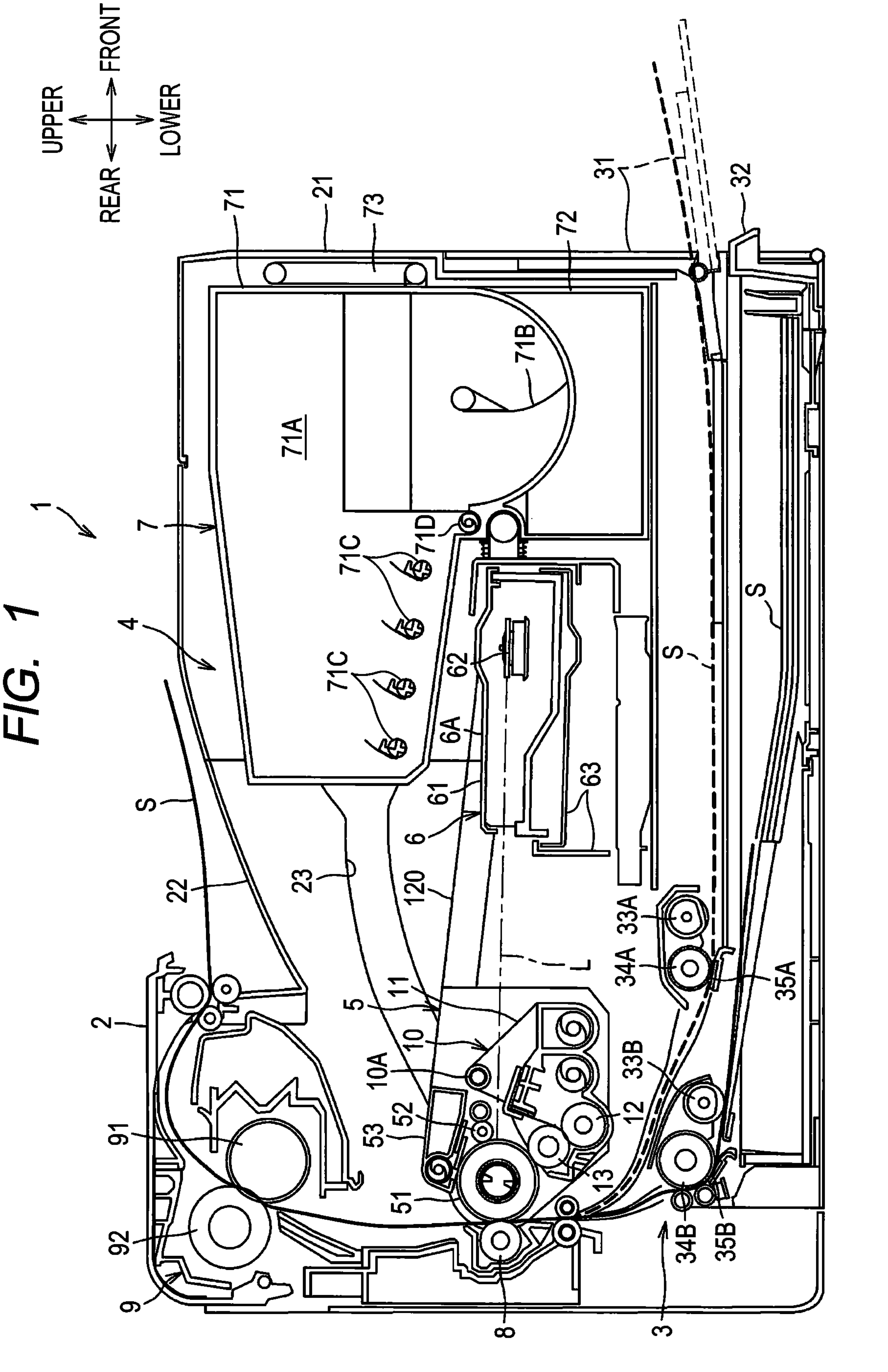
FIG. 1 is a schematic diagram showing an image forming apparatus according to an embodiment.

In the above-described image forming apparatus, there is a problem that, if the volume of a toner container is increased, the image forming apparatus becomes large in the vertical direction.

In view of the foregoing, an example of an object of this disclosure is to increase the volume of the toner container while suppressing height of the image forming apparatus.

An aspect of this disclosure will be described while referring to the drawings.

In the following description, directions are defined based on a view of a user who uses an image forming apparatus 1. That is, the right side in FIG. 1 is defined as “front”, the left side in FIG. 1 is defined as "rear", the near side in the direction perpendicular to the drawing sheet is defined as "left", and the far side in the direction perpendicular to the drawing sheet is defined as "right". Further, the upper and lower in FIG. 1 are defined as "upper" and "lower".

As shown in FIG. 1, an image forming apparatus 1 such as a monochromatic laser printer mainly includes an apparatus main body 2, a supply unit 3, and an image forming unit 4.

The apparatus main body 2 includes a front cover 21, a paper discharge tray 22 that is located in an upper portion of the apparatus main body 2, and a mount guide 23. The front cover 21 is arranged at a front end portion of the apparatus main body 2. By operating the front cover 21 (see FIG. 10), a process cartridge 5 and a toner cartridge 7 described later can be mounted and detached. A manual feed tray 31 for placing a recording sheet S is rotatably provided at the front cover 21. The mount guide 23 guides the process cartridge 5 when the process cartridge 5 is mounted or detached.

The supply unit 3 is provided in a lower portion within the apparatus main body 2. The supply unit 3 includes the manual feed tray 31 and a supply tray 32 that is provided below the manual feed tray 31. Each of the manual feed tray 31 and the supply tray 32 is configured to individually support recording sheets S. The supply unit 3 includes a first pickup roller 33A, a first separation roller 34A, and a first separation pad 35A for the manual feed tray 31, and includes a second pickup roller 33B, a second separation roller 34B, and a second separation pad 35B for the supply tray 32. The recording sheets S are picked up by the pickup rollers 33A and 33B, separated by the separation rollers 34A and 34B and the separation pads 35A and 35B one sheet at a time, and supplied toward the image forming unit 4.

The image forming unit 4 mainly includes the process cartridge 5, a scanner unit 6, a toner cartridge 7, a transfer roller 8, and a fixing unit 9.

The process cartridge 5 is arranged above the supply unit 3 and near a rear end portion of the apparatus main body 2 in a front-rear direction. The process cartridge 5 mainly includes a photosensitive drum 51, a charging roller 52, and a development unit 10. The process cartridge 5 can be detachably mounted on the apparatus main body 2. The photosensitive drum 51 rotates about a rotation axis that extends in a left-right direction serving as an example of a first direction. The development unit 10 mainly includes a housing 11, a supply roller 12, and a development roller 13. The development unit 10 is configured to supply toner to the photosensitive drum 51.

The scanner unit 6 is arranged substantially in the center of the apparatus main body 2. The scanner unit 6 mainly includes, within a scanner housing 61, a polygon mirror 62, a laser emitting portion (not shown), and a lens (not shown). The polygon mirror 62 deflects light for exposing the photosensitive drum 51. In the scanner unit 6, a laser beam passes through a light path L indicated by a single-dot chain line in FIG. 1 and is irradiated onto the surface of the photosensitive drum 51 by high-speed scanning.

The scanner housing 61 is supported by a bracket 63, and thereby the scanner unit 6 is fixed to the apparatus main body 2. The scanner housing 61 includes an upper surface 6A. In other words, the scanner unit 6 includes the upper surface 6A. The upper surface 6A guides the process cartridge 5 to the mount guide 23 when the process cartridge 5 is mounted onto the apparatus main body 2 (see FIG. 11B).

The toner cartridge 7 is arranged above the supply unit 3 and near the front end portion of the apparatus main body 2. The toner cartridge 7 stores toner therein, and mainly includes a toner container 71 that stores the toner and a waste-toner container 72 that stores waste toner.

The photosensitive drum 51 of the process cartridge 5, the scanner unit 6 and the toner cartridge 7 are aligned in this order in a front-rear direction. The front-rear direction serves as an example of a second direction perpendicular to both the first direction and the gravitational direction. At least part of the photosensitive drum 51, at least part of the scanner unit 6, and at least part of the toner cartridge 7 overlap one another as viewed from the front-rear direction. In the present embodiment, the photosensitive drum 51, the polygon mirror 62 of the scanner unit 6, and the toner cartridge 7 overlap one another as viewed from the front-rear direction.

The transfer roller 8 is arranged to face the photosensitive drum 51 within the apparatus main body 2.

The fixing unit 9 is provided above the process cartridge 5 and includes a heating roller 91 and a pressure roller 92 that faces the heating roller 91 and presses the heating roller 91.

In the image forming unit 4, the surface of the photosensitive drum 51 is uniformly charged by the charging roller 52 and is thereafter exposed by the high-speed scanning of the laser light from the scanner unit 6, and thereby an electrostatic latent image is formed on the photosensitive drum 51. The toner within the toner cartridge 7 is supplied through the supply roller 12 to the development roller 13 to be carried on the development roller 13.

Then, the toner carried on the development roller 13 is supplied to the electrostatic latent image on the photosensitive drum 51, and thereby the electrostatic latent image is visualized, and a toner image is formed on the photosensitive drum 51. Thereafter, the recording sheet S supplied from the supply unit 3 is conveyed between the photosensitive drum 51 and the transfer roller 8, and thereby the toner image on the photosensitive drum 51 is transferred onto the recording sheet S. Then, the recording sheet S is conveyed between the heating roller 91 and the pressure roller 92, and thereby the toner image transferred on the recording sheet S is thermally fixed. The recording sheet S on which the toner image is thermally fixed is discharged to the outside of the apparatus main body 2 and is stacked on the paper discharge tray 22.

The detailed configuration of the process cartridge 5 will be described.

Figure 2:
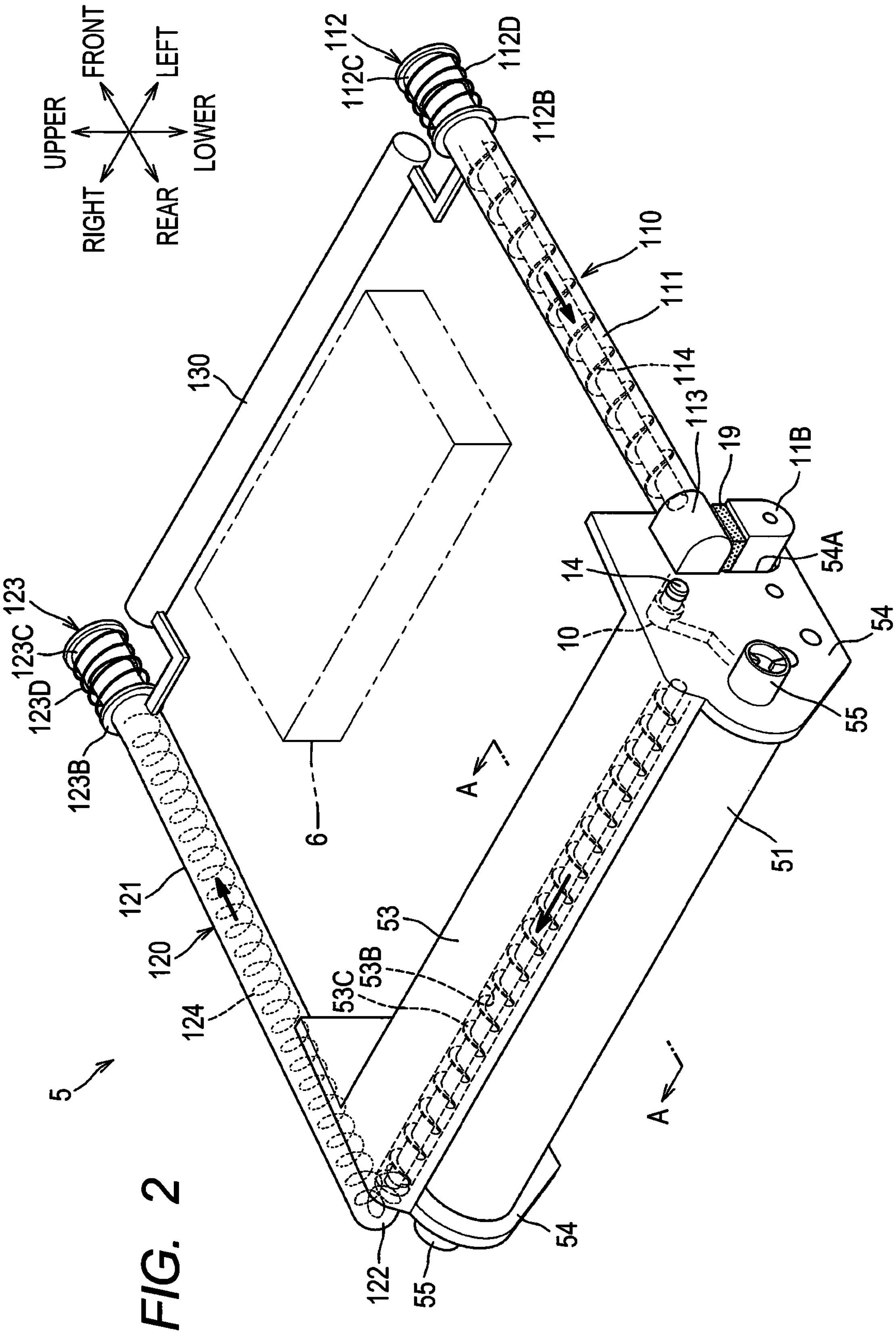
FIG. 2 is a perspective view of a process cartridge.

As shown in FIG. 2, the process cartridge 5 includes a drum cleaner 53, a pair of left and right side frames 54, a pair of protrusion portions 55, a toner conveyance pipe 110, a waste-toner conveyance pipe 120, and a grip portion 130, in addition to the photosensitive drum 51 and so on described above.

The side frames 54 are individually arranged at both end portions in the left-right direction to be arranged as a pair, and support the photosensitive drum 51, the drum cleaner 53, and the development unit 10. The side frame 54 is formed with a through hole 54A (also see FIG. 6). The through hole 54A is slightly larger than an extension portion 11B of the development unit 10 described later.

Figure 11A:
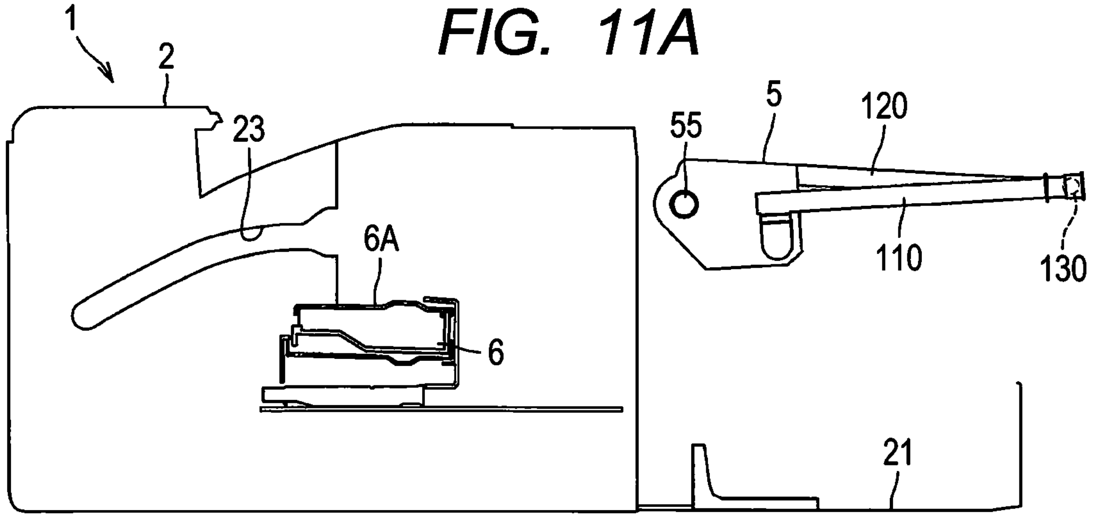
FIGS. 11A, 11B, and 11C are diagrams for illustrating an operation in which the process cartridge is mounted onto an apparatus main body.

One of the pair of protrusion portions 55 is arranged at the left end of the process cartridge 5 and protrudes from the left side frame 54 in the leftward direction. The other of the pair of protrusion portions 55 is arranged at the right end of the process cartridge 5 and protrudes from the right side frame 54 in the rightward direction. Each protrusion portion 55 engages the mount guide 23 of the apparatus main body 2 when the process cartridge 5 is mounted onto or detached from the apparatus main body 2 (see FIG. 11).

Figure 3:
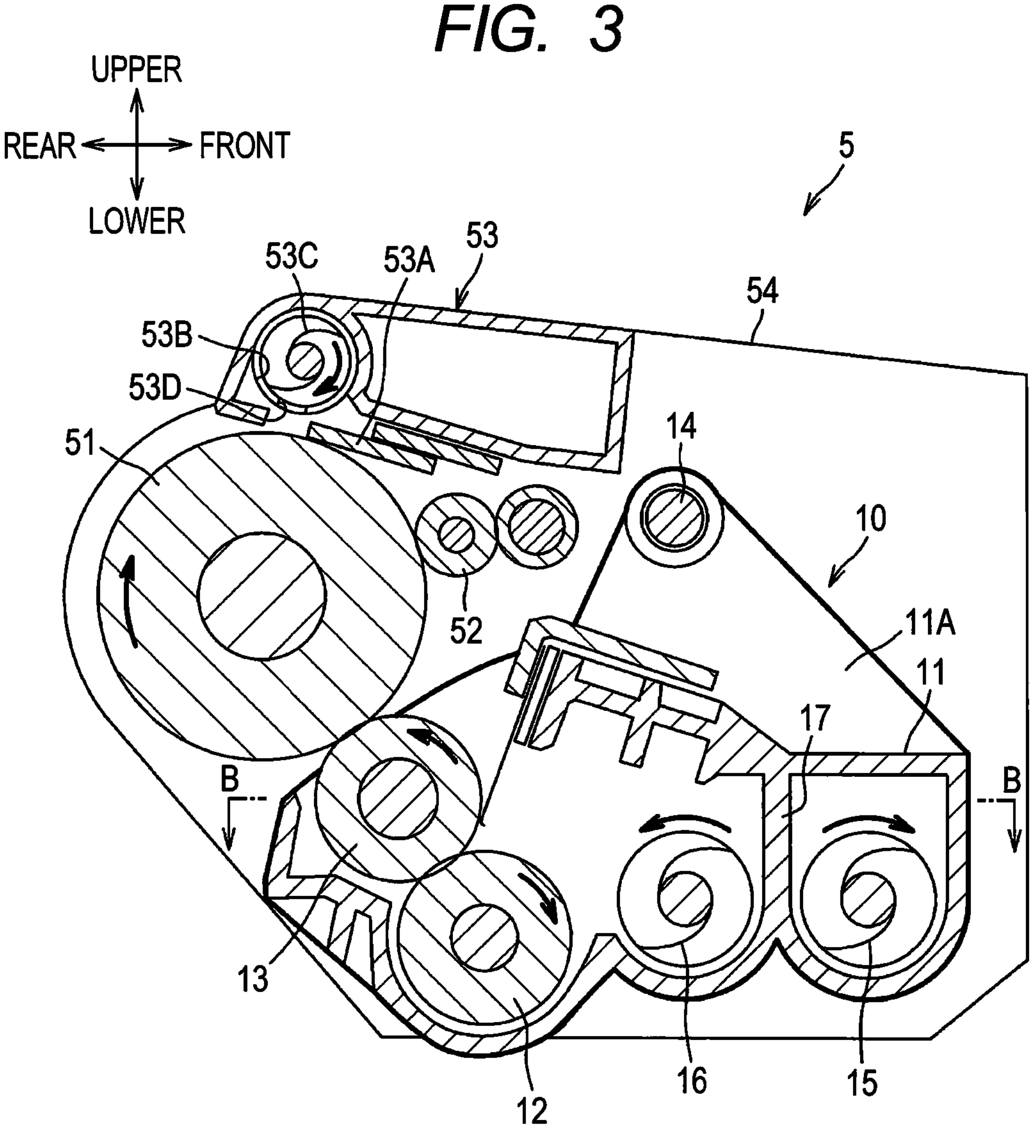
FIG. 3 is a cross-sectional view taken along a line A-A in FIG. 2.

The drum cleaner 53 collects the waste toner from the photosensitive drum 51. As shown in FIG. 3, the drum cleaner 53 is arranged above the photosensitive drum 51. The drum cleaner 53 includes a cleaning blade 53A, a conveyance tube 53B, and a waste-toner auger 53C.

The cleaning blade 53A is a plate-shaped member and extends in the left-right direction. The cleaning blade 53A is arranged such that the tip end thereof is in contact with the circumferential surface of the photosensitive drum 51. The conveyance tube 53B has a cylindrical shape and extends in the left-right direction. The conveyance tube 53B includes an opening 53D in a part facing the photosensitive drum 51. The waste-toner auger 53C is arranged within the conveyance tube 53B. The waste toner that is scraped off with the cleaning blade 53A from the photosensitive drum 51 enters the inside of the conveyance tube 53B through the opening 53D and is thereafter conveyed rightward by the waste-toner auger 53C.

Figures 4A, 4B:
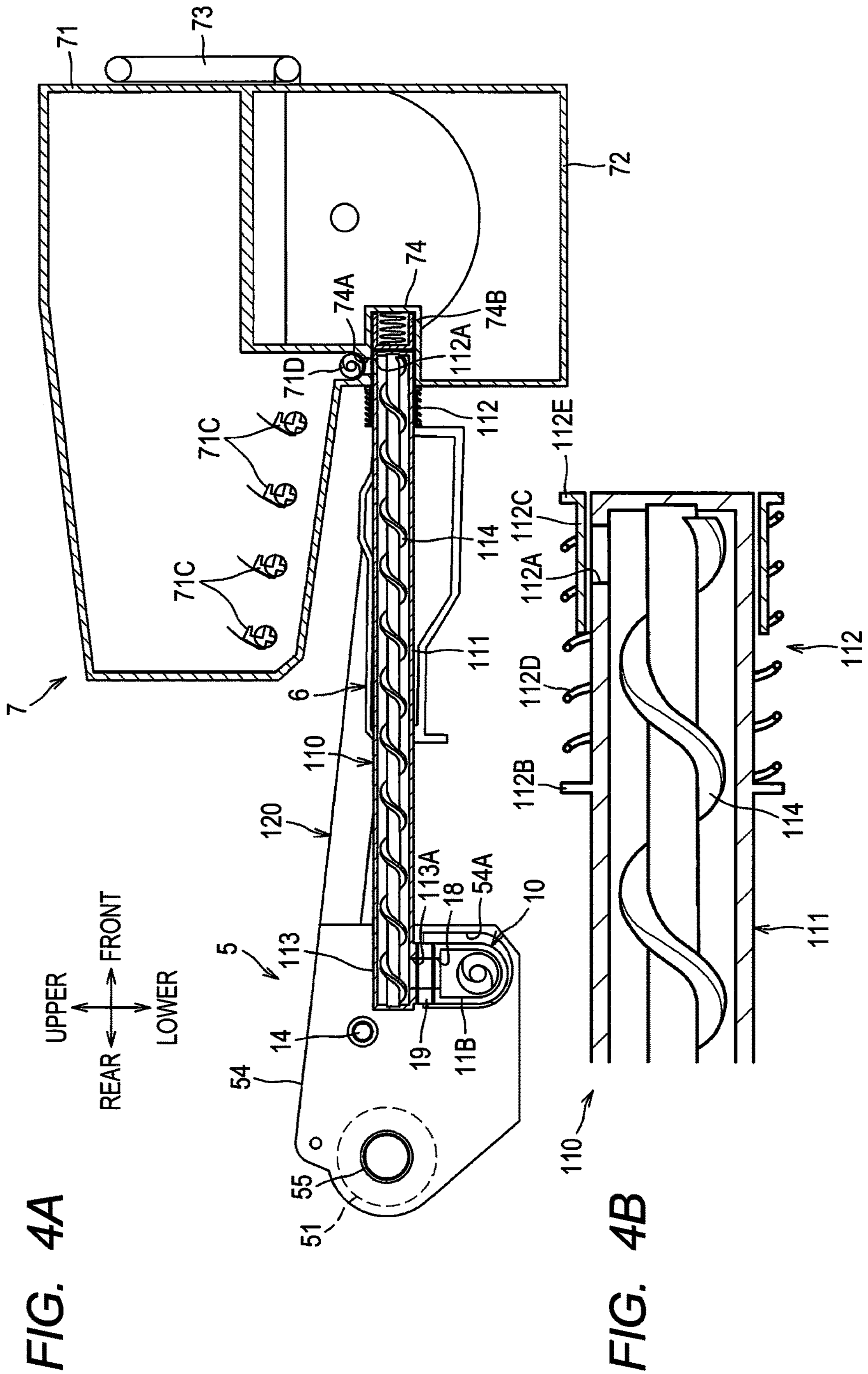
FIG. 4A is a cross-sectional view showing a state after the process cartridge and a toner cartridge are connected.
FIG. 4B is a cross-sectional view showing a front end of a toner conveyance pipe before the process cartridge and the toner cartridge are connected.

As shown in FIG. 2, the toner conveyance pipe 110 has a cylindrical shape and extends in the front-rear direction. As shown in FIG. 4A, the toner conveyance pipe 110 overlaps at least part of the scanner unit 6 as viewed from the left-right direction. The toner conveyance pipe 110 includes a main body portion 111, a first reception portion 112, a first discharge portion 113, and a first auger 114.

The main body portion 111 has a hollow cylindrical shape, and the first auger 114 is arranged therein. The first reception portion 112 is arranged at the front end of the toner conveyance pipe 110 and is configured to be connected to the toner cartridge 7. The first discharge portion 113 is arranged at the rear end of the toner conveyance pipe 110 and is fixed to the left side surface of the side frame 54. A supply port 113A for supplying the toner to the development unit 10 is provided at a lower portion of the first discharge portion 113. The first auger 114 receives a drive force from a drive source (not shown) to be rotated and thereby conveys the toner within the main body portion 111 from the front end to the rear end. In other words, the toner conveyance pipe 110 is configured to convey the toner from the toner cartridge 7 to the development unit 10.

As shown in FIG. 4B, the first reception portion 112 includes a first hole 112A, a first flange 112B, a first shutter 112C, and a first spring 112D. The first hole 112A is arranged in an upper portion of the outer circumferential surface of the first reception portion 112. The first flange 112B is formed at a particular distance rearward away from the first hole 112A and protrudes from the outer circumferential surface of the first reception portion 112.

The first shutter 112C has a cylindrical shape and slidably moves forward and rearward relative to the outer circumferential surface of the first reception portion 112. Specifically, the first shutter 112C is configured to move between an open position (the position of FIG. 4A) at which the first hole 112A is opened and a closed position (the position of FIG. 4B) at which the first hole 112A is closed. In the front end of the first shutter 112C, a flange-shaped spring engagement portion 112E is formed. The first spring 112D is arranged between the first flange 112B and the spring engagement portion 112E to constantly urge the first shutter 112C toward the closed position.

As shown in FIG. 4A, when the first reception portion 112 is connected to the toner cartridge 7, the housing of the toner cartridge 7 presses the first shutter 112C rearward to move the first shutter 112C to the open position, and thereby the first hole 112A is opened.

As shown in FIG. 4B, when the first reception portion 112 is detached from the toner cartridge 7, the first shutter 112C moves to the closed position by the urging force of the first spring 112D, and thereby the first hole 112A is closed.

As shown in FIG. 2, the waste-toner conveyance pipe 120 has a cylindrical shape and extends from the outer side of the right side frame 54 in the front-rear direction. The waste-toner conveyance pipe 120 overlaps at least part of the scanner unit 6 as viewed from the left-right direction (see FIG. 1). The waste-toner conveyance pipe 120 includes a main body portion 121, a reception portion 122, a second discharge portion 123, and a coil auger 124. The main body portion 121 has a hollow cylindrical shape, and the coil auger 124 is arranged therein.

The reception portion 122 is arranged at the rear end of the waste-toner conveyance pipe 120 and is fixed to the right side frame 54. The reception portion 122 communicates with the conveyance tube 53B of the drum cleaner 53. The second discharge portion 123 is arranged at the front end of the waste-toner conveyance pipe 120, and is configured to be connected to the waste-toner container 72 of the toner cartridge 7. The rear end of the coil auger 124 is connected to the waste-toner auger 53C of the drum cleaner 53, and the coil auger 124 rotates together with the waste-toner auger 53C to convey the waste toner within the main body portion 121. The waste-toner conveyance pipe 120 conveys the waste toner collected by the drum cleaner 53 to the waste-toner container 72.

Figure 5A:
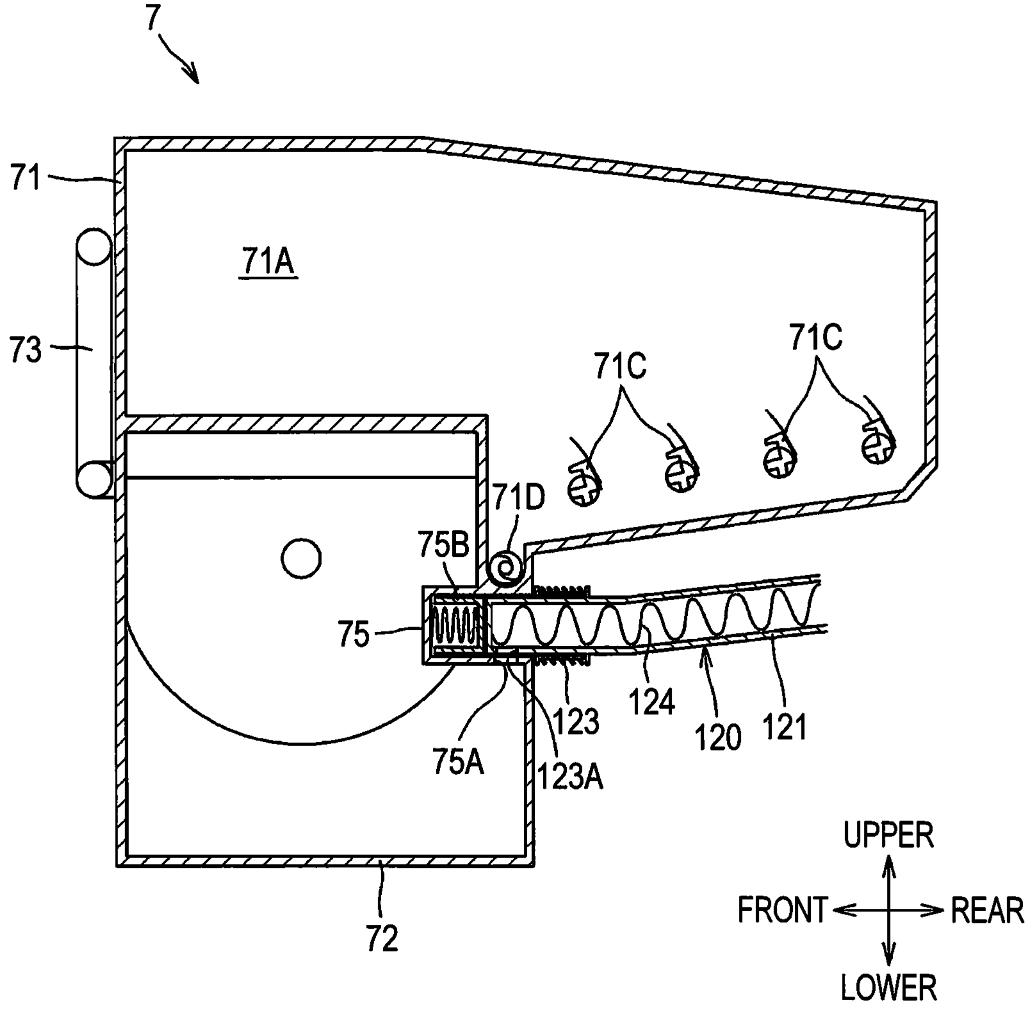
FIG. 5A is a cross-sectional view showing a state after a waste-toner conveyance pipe and the toner cartridge are connected.
Figure 5B:
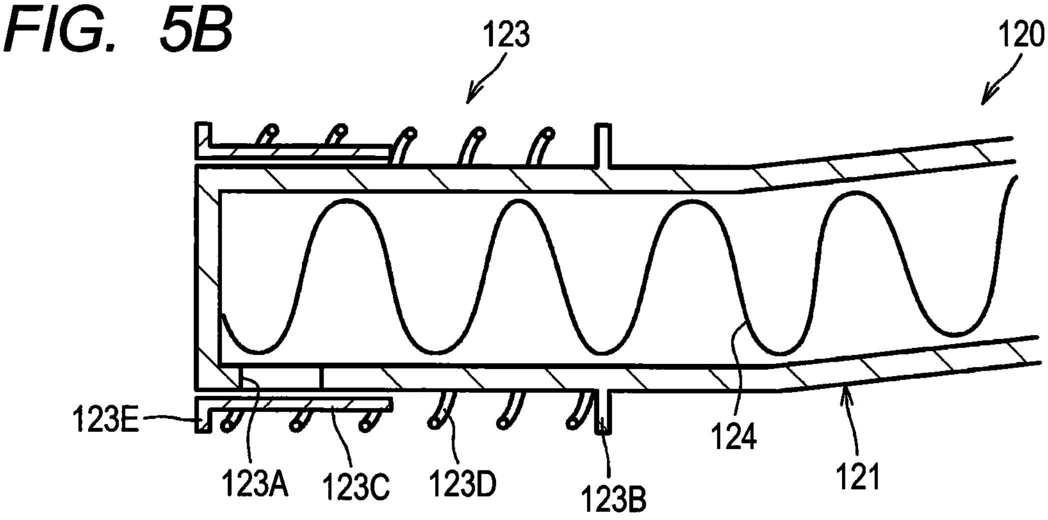
FIG. 5B is a cross-sectional view showing a front end part of the waste-toner conveyance pipe before the waste-toner conveyance pipe and the toner cartridge are connected.

As shown in FIG. 5B, the second discharge portion 123 includes a second hole 123A, a second flange 123B, a second shutter 123C, and a second spring 123D. The second hole 123A is arranged in a lower portion of the outer circumferential surface of the second discharge portion 123. The second flange 123B is formed at a particular distance rearward away from the second hole 123A, and protrudes from the outer circumferential surface of the second discharge portion 123.

The second shutter 123C has a cylindrical shape and slidably moves forward and rearward relative to the outer circumferential surface of the second discharge portion 123. Specifically, the second shutter 123C is configured to move between an open position (the position of FIG. 5A) at which the second hole 123A is opened and a closed position (the position of FIG. 5B) at which the second hole 123A is closed. A flange-shaped spring engagement portion 123E is formed at the front end of the second shutter 123C. The second spring 123D is arranged between the second flange 123B and the spring engagement portion 123E to constantly urge the second shutter 123C toward the closed position.

As shown in FIG. 5A, when the second discharge portion 123 is connected to the toner cartridge 7, the housing of the toner cartridge 7 presses the second shutter 123C rearward to move the second shutter 123C to the open position, and thereby the second hole 123A is opened.

As shown in FIG. 5B, when the second discharge portion 123 is detached from the toner cartridge 7, the second shutter 123C moves to the closed position by the urging force of the second spring 123D, and thereby the second hole 123A is closed.

As shown in FIG. 2, the grip portion 130 extends in the left-right direction to couple the toner conveyance pipe 110 and the waste-toner conveyance pipe 120. One end of the grip portion 130 is fixed to an end portion (front end portion) of the toner conveyance pipe 110 away from the photosensitive drum 51 in the front-rear direction. The other end of the grip portion 130 is fixed to an end portion (front end portion) of the waste-toner conveyance pipe 120 away from the photosensitive drum 51 in the front-rear direction.

As shown in FIG. 3, the development unit 10 further includes side walls 11A, a swing shaft 14, a second auger 15, a third auger 16, and a partition plate 17, in addition to the housing 11, the supply roller 12, and the development roller 13 described above.

The side walls 11A are provided at both sides of the development unit 10 in the left-right direction. Each side wall 11A extends upward from the housing 11.

The swing shaft 14 extends in the left-right direction, and both end portions are fixed to the side walls 11A. Both ends of the swing shaft 14 are swingably supported by the pair of side frames 54 of the process cartridge 5. With this configuration, the development unit 10 is configured to swingably move relative to the pair of side frames 54. The development unit 10 is urged by an urging member (not shown) such as a spring, and thereby the development roller 13 is pressed against the photosensitive drum 51.

Figure 6:
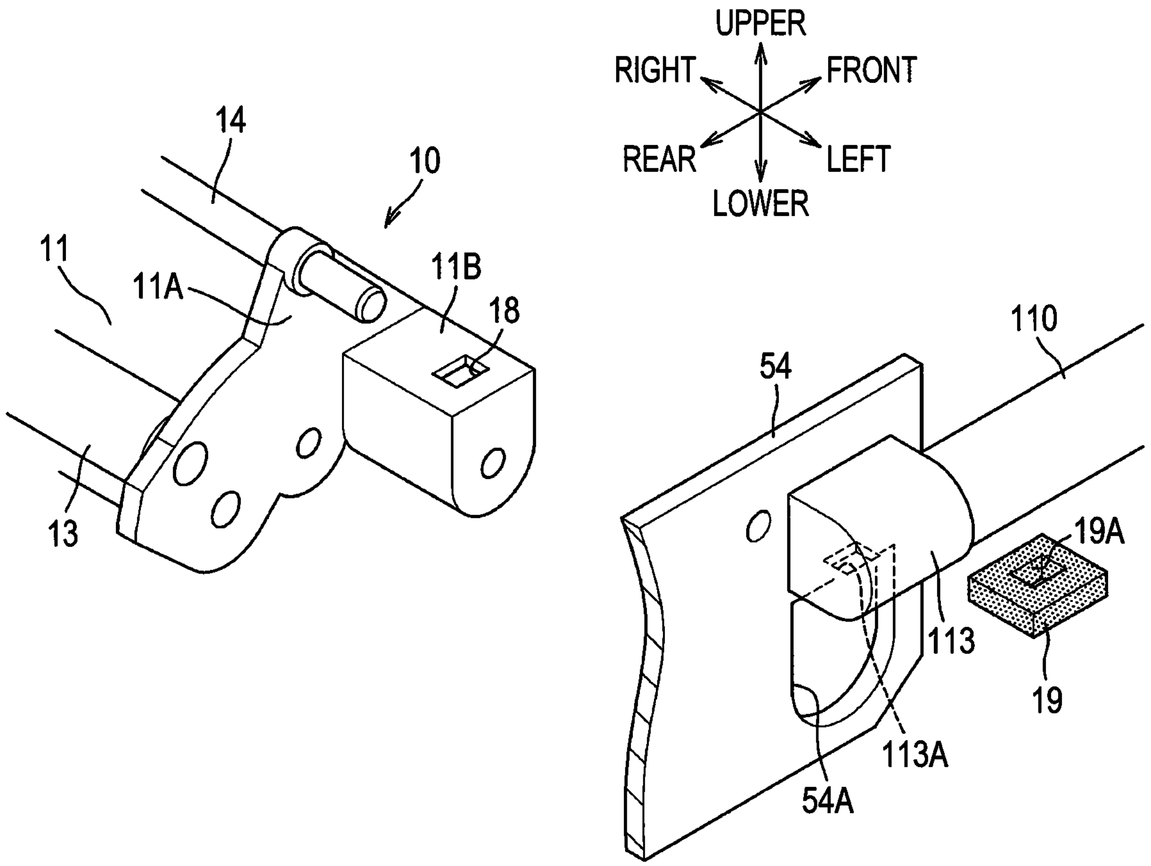
FIG. 6 is an exploded perspective view showing a connection part of a development unit and the toner conveyance pipe.

As shown in FIG. 6, the housing 11 includes the extension portion 11B and a reception port 18. The extension portion 11B is part of the housing 11 and extends out from the housing 11 in the leftward direction. The reception port 18 is a hole formed in the upper surface of the extension portion 11B, and receives toner from the toner conveyance pipe 110.

As shown in FIG. 2, the extension portion 11B penetrates the through hole 54A formed in the side frame 54 arranged at the left side, and extends out (protrudes) from the left side surface of the side frame 54 arranged at the left side in the leftward direction. Since the through hole 54A is formed to be slightly larger than the extension portion 11B, the extension portion 11B is inserted in the through hole 54A with a gap (space) (see FIG. 4). Hence, even when the development unit 10 swingably moves relative to the side frame 54, the extension portion 11B does not interfere with the through hole 54A (that is, movement of the development unit 10 is not prevented by the through hole 54A). With respect to the side frame 54 arranged at the left side (one of the pair of side frames 54), the reception port 18 is arranged at an opposite side from the side frame 54 arranged at the right side (the other side frame 54) in the left-right direction.

A seal member 19 is arranged between the reception port 18 of the development unit 10 and the supply port 113A of the toner conveyance pipe 110. As shown in FIG. 6, the seal member 19 is a member such as a sponge that has elasticity with a hole 19A in the center. The seal member 19 is arranged to surround the peripheries of the reception port 18 and the supply port 113A. With this configuration, the reception port 18 and the supply port 113A communicate with each other through the seal member 19. The seal member 19 is sandwiched between the reception port 18 and the supply port 113A and is in a compressed state.

Figure 7:
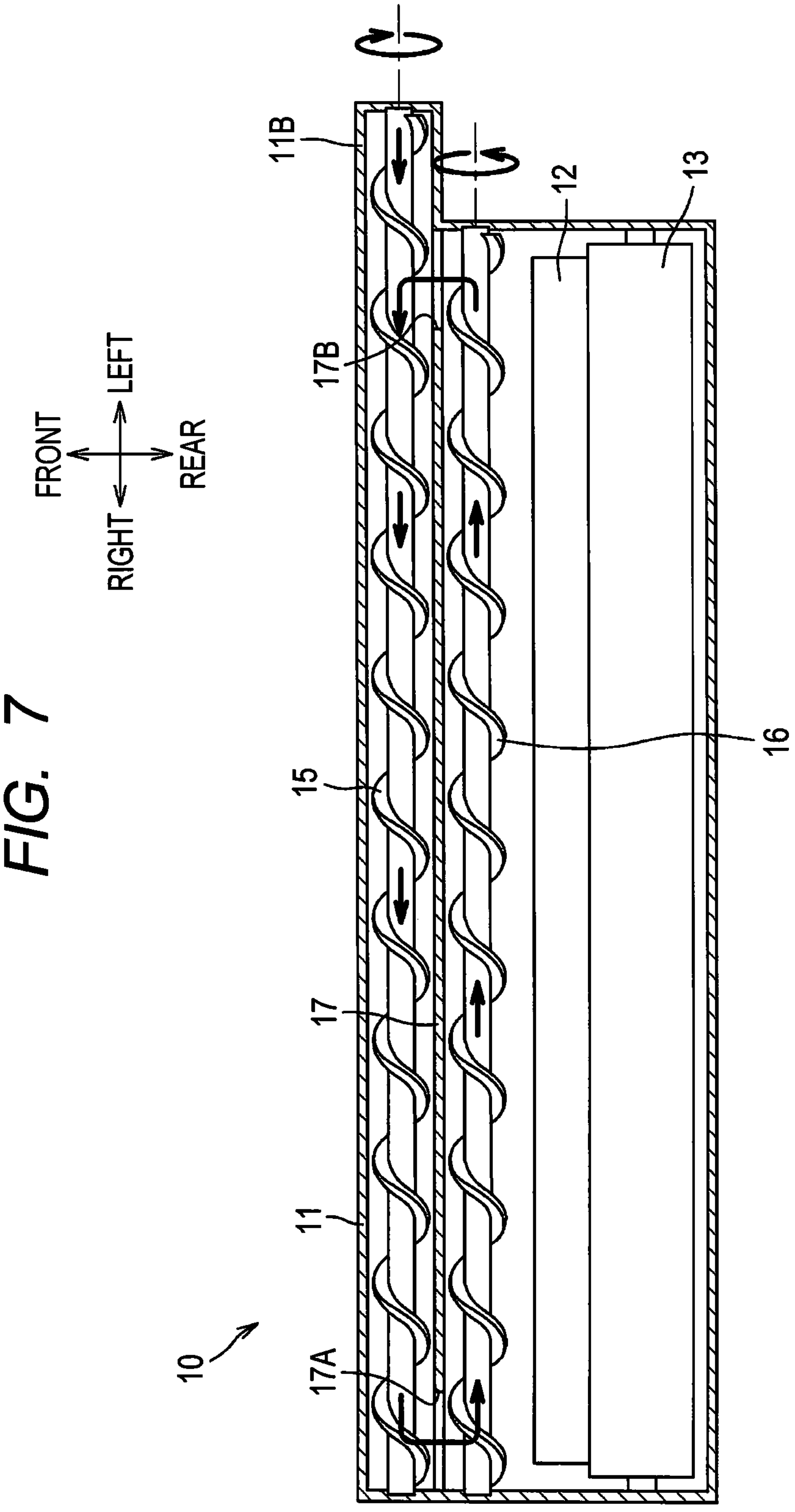
FIG. 7 is a cross-sectional view taken along a line B-B in FIG. 3.

As shown in FIG. 7, the second auger 15 is arranged to extend to inside the extension portion 11B in the left-right direction. The second auger 15 has a spiral blade around a shaft extending in the left-right direction. The second auger 15 rotates in a first rotation direction (clockwise in FIG. 3) to convey, in the rightward direction, the toner having entered the development unit 10 from the reception port 18.

The third auger 16 is arranged between the second auger 15 and the supply roller 12. The third auger 16 has substantially the same configuration as the second auger 15 and is arranged to face (in juxtaposition with) the second auger 15. The third auger 16 rotates in a second rotation direction (counterclockwise in FIG. 3) to convey the toner within the development unit 10 in the leftward direction. The second rotation direction is a direction opposite from the first rotation direction.

The partition plate 17 is provided between the second auger 15 and the third auger 16. A first opening 17A and a second opening 17B are formed in the partition plate 17. The first opening 17A is provided at the right end of the partition plate 17. The toner conveyed by the second auger 15 in the rightward direction passes through the first opening 17A to move from the second auger 15 toward the third auger 16. The second opening 17B is provided at the left end of the partition plate 17. With this configuration, the toner passes through the second opening 17B to move from the third auger 16 toward the second auger 15. In this way, the toner is circulated within the development unit 10 so as not to accumulate in one place.

The detailed configuration of the toner cartridge 7 will be described.

As shown in FIG. 1, the toner cartridge 7 is formed in an inverted "L" shape as viewed from the left-right direction and is arranged to cover the upper side and the front side of the scanner unit 6. Specifically, as viewed from the left-right direction, the toner cartridge 7 extends upward and rearward from the front side of the scanner unit 6 to cover the upper side of the scanner unit 6. Here, the front side of the scanner unit 6 is a side facing the toner cartridge 7 in the front-rear direction.

The toner cartridge 7 includes a handle 73 in addition to the toner container 71 and the waste-toner container 72 described previously. In the present embodiment, the toner cartridge 7 includes the toner container 71 and the waste-toner container 72 that are formed integrally.

Figure 9A:
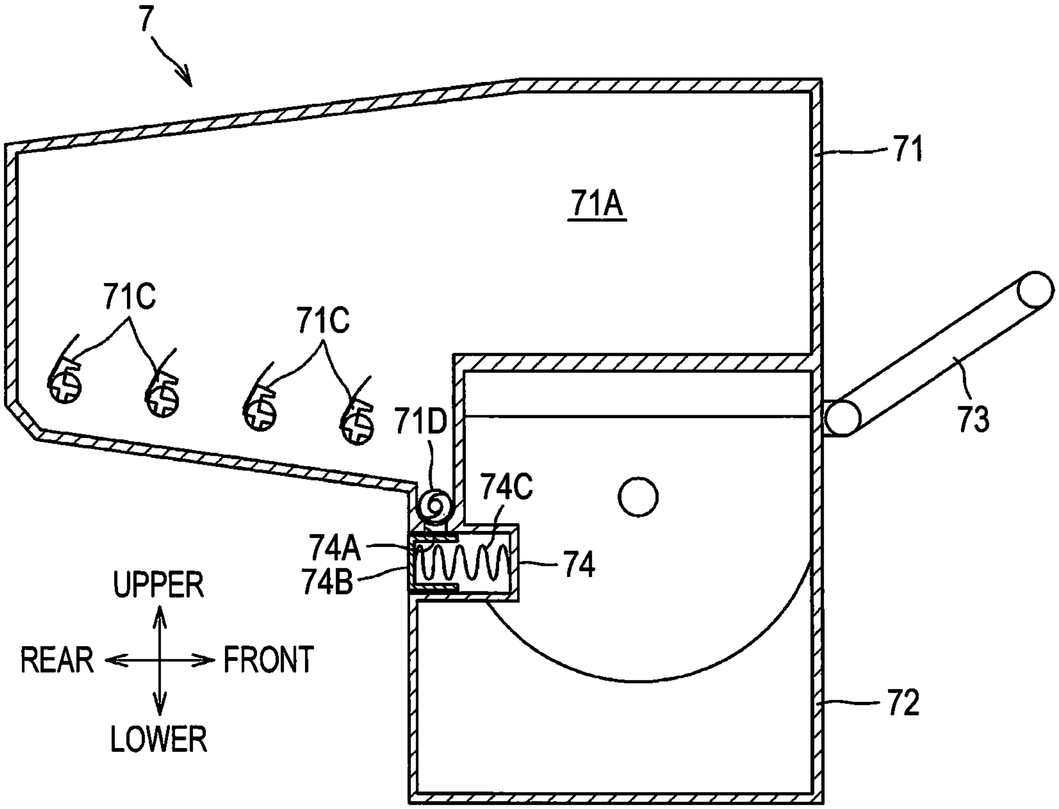
FIG. 9A is a cross-sectional view taken along a line C-C in FIG. 8.

The toner container 71 includes a toner storage chamber 71A that stores toner, a main agitator 71B that agitates the toner, sub-agitators 71C, a fourth auger 71D, and a first connection portion 74 (see FIG. 9A).

The main agitator 71B and the sub-agitators 71C are arranged within the toner storage chamber 71A so as to rotate by receiving a drive force from a drive source (not shown) to agitate the toner therein and to move the toner toward the fourth auger 71D. The numbers and arrangements of the main agitator 71B and the sub-agitators 71C may be changed as necessary according to the shape of the toner cartridge 7.

The fourth auger 71D extends in the left-right direction. The fourth auger 71D receives a drive force from a drive source (not shown) to convey the toner from the right side to the left side and to thereby send the toner to the first connection portion 74.

Figure 8:
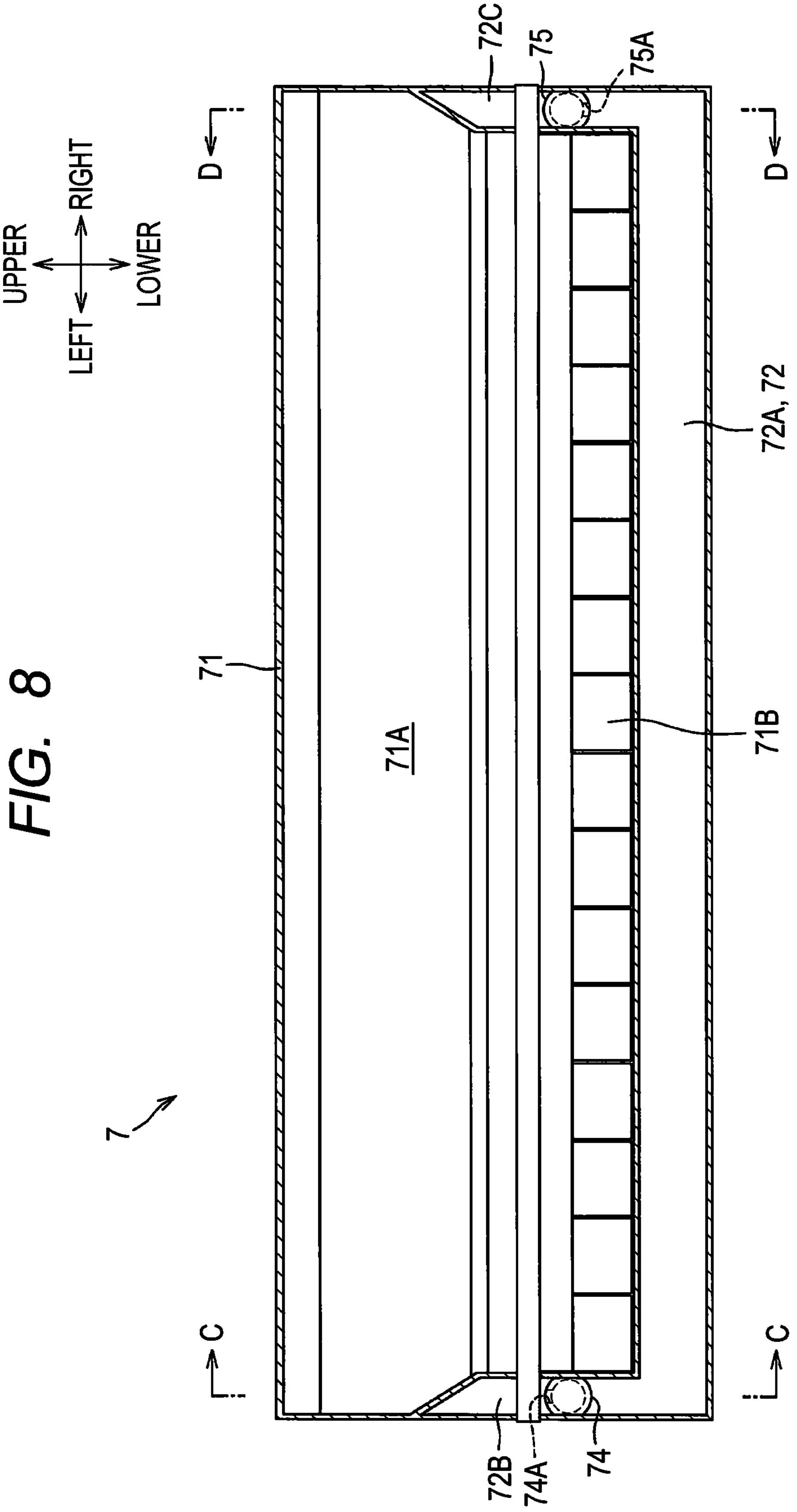
FIG. 8 is a cross-sectional view in which the toner cartridge is viewed from the front.

As shown in FIG. 9A, the first connection portion 74 is arranged below the fourth auger 71D and at the left end of the toner container 71 (also see FIG. 8). The first connection portion 74 is a cylindrical insertion hole to which the first reception portion 112 of the toner conveyance pipe 110 is connected. The first connection portion 74 includes a first discharge port 74A, a third shutter 74B, and a third spring 74C.

The first discharge port 74A is formed in the upper surface of the first connection portion 74 and communicates with the toner storage chamber 71A. The third shutter 74B slidably moves between a closed position (the position of FIG. 9A) at which the first discharge port 74A is closed and an open position (the position of FIG. 4A) at which the first discharge port 74A is opened. The third spring 74C is arranged between the third shutter 74B and the toner container 71 to constantly urge the third shutter 74B toward the closed position.

As shown in FIG. 4A, when the first reception portion 112 is connected to the toner cartridge 7, the tip end of the toner conveyance pipe 110 presses the third shutter 74B forward to move the third shutter 74B to the open position, and thereby the first discharge port 74A is opened.

As shown in FIG. 9A, when the first reception portion 112 is detached from the toner cartridge 7, the third shutter 74B moves to the closed position due to the urging force of the third spring 74C, and thereby the first discharge port 74A is closed.

The waste-toner container 72 is arranged below the toner container 71. As shown in FIG. 8, the waste-toner container 72 is formed in a squared "U" shape as viewed from the front-rear direction. The waste-toner container 72 wraps around both left and right sides of the toner container 71 from below the toner container 71. Specifically, the waste-toner container 72 includes a bottom portion 72A that extends laterally along the bottom surface of the toner container 71, a left extension portion 72B that extends upward from the left end of the bottom portion 72A, and a right extension portion 72C that extends upward from the right end of the bottom portion 72A. A second connection portion 75 is arranged at the right extension portion 72C.

Figure 9B:
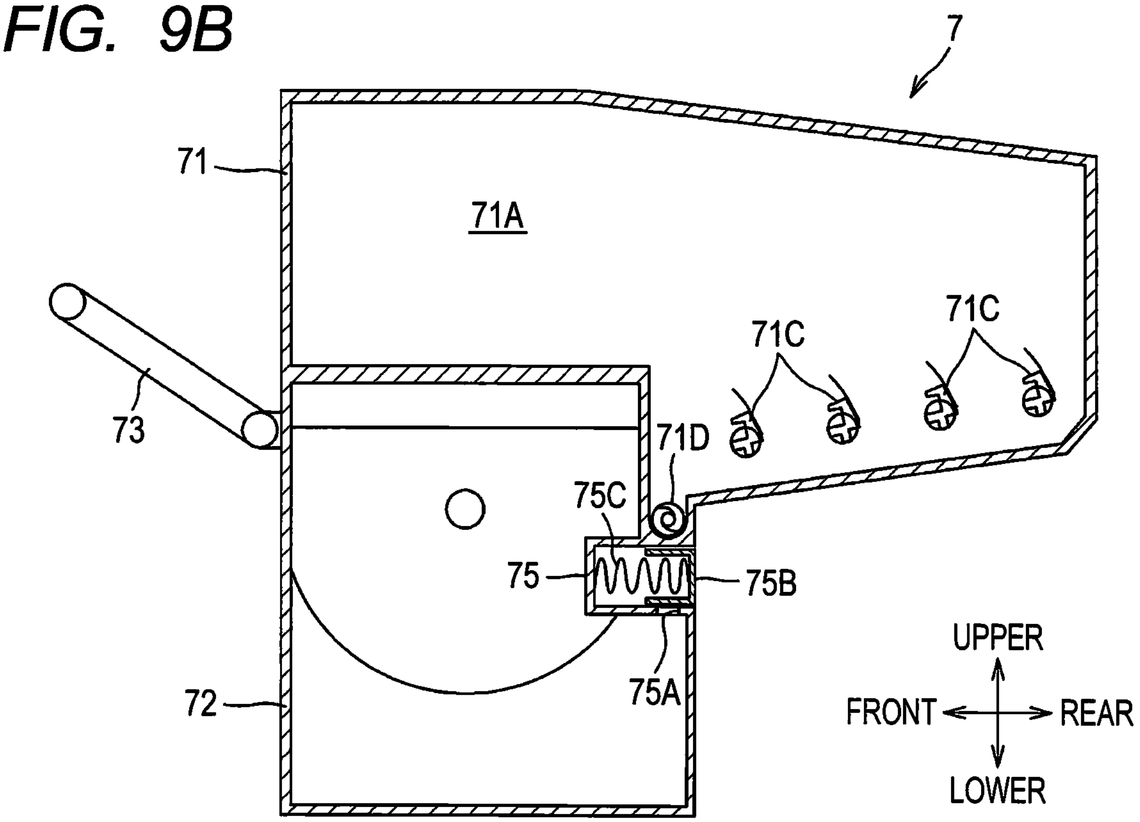
FIG. 9B is a cross-sectional view taken along a line D-D in FIG. 8.

As shown in FIG. 9B, the second connection portion 75 is a cylindrical insertion hole to which the second discharge portion 123 of the waste-toner conveyance pipe 120 is connected. The second connection portion 75 includes a second discharge port 75A, a fourth shutter 75B, and a fourth spring 75C.

The second discharge port 75A is formed at the lower surface of the second connection portion 75 and communicates with the right extension portion 72C of the waste-toner container 72. The fourth shutter 75B slidably moves between a closed position (the position of FIG. 9B) at which the second discharge port 75A is closed and an open position (the position of FIG. 5A) at which the second discharge port 75A is opened. The fourth spring 75C is arranged between the fourth shutter 75B and the waste-toner container 72 to constantly urge the fourth shutter 75B toward the closed position.

As shown in FIG. 5A, when the second discharge portion 123 is connected to the toner cartridge 7, the tip end of the waste-toner conveyance pipe 120 presses the fourth shutter 75B forward to move the fourth shutter 75B to the open position, and thereby the second discharge port 75A is opened.

As shown in FIG. 9B, when the second discharge portion 123 is detached from the toner cartridge 7, the fourth shutter 75B moves to the closed position due to the urging force of the fourth spring 75C, and thereby the second discharge port 75A is closed.

As shown in FIG. 1, a lower end portion of the handle 73 is rotatably attached to the toner container 71. When the toner container 71 is mounted onto or detached from the apparatus main body 2, as shown in FIG. 9A, the handle 73 is rotatably moved forward.

A method of mounting the toner cartridge 7 and the process cartridge 5 onto the apparatus main body 2 and a method of detaching the toner cartridge 7 and the process cartridge 5 from the apparatus main body 2 will be described.

Figure 10:
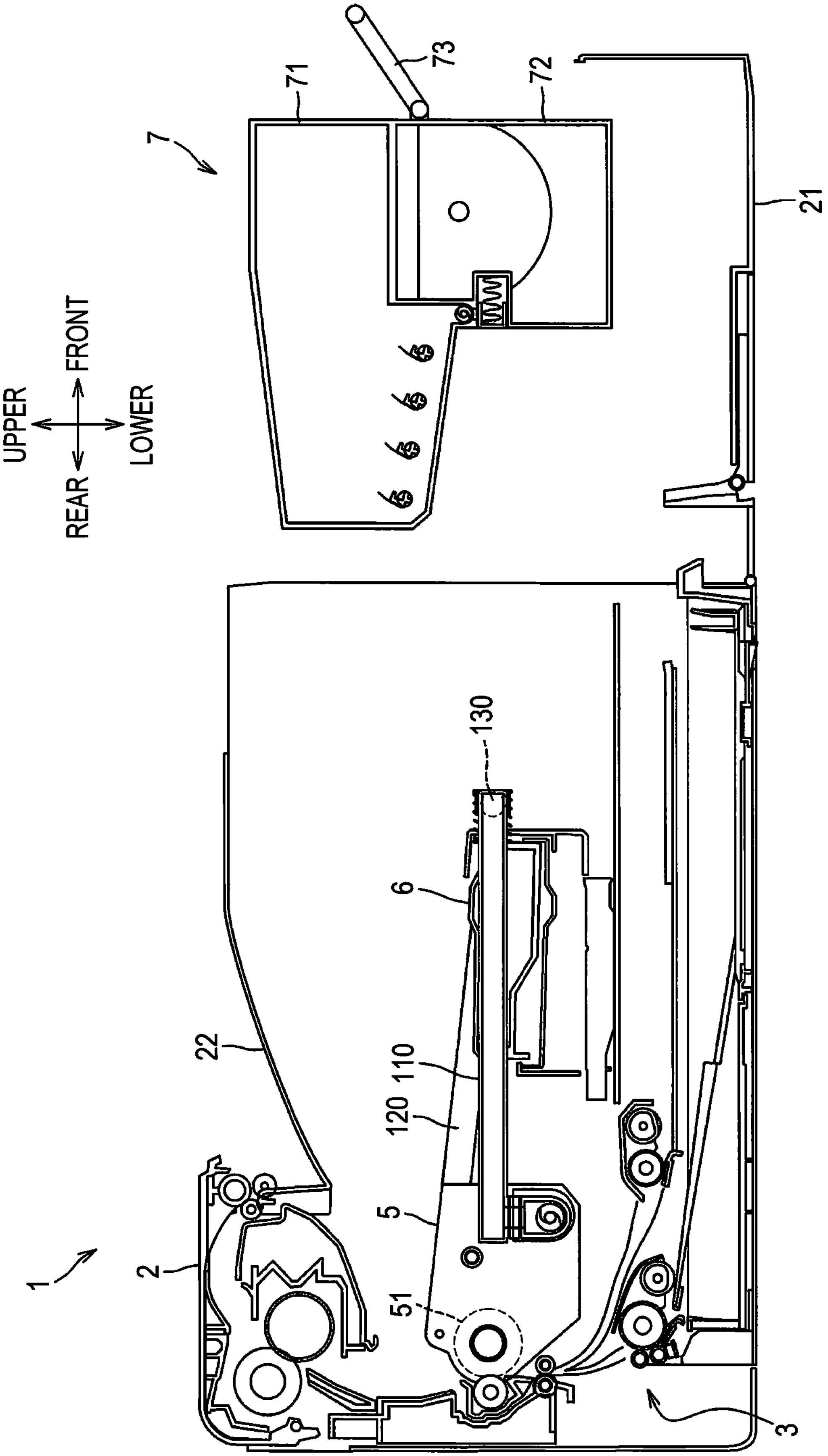
FIG. 10 shows a state in which the toner cartridge is detached from a main housing.

When the toner cartridge 7 is detached from the apparatus main body 2, as shown in FIG. 10, the front cover 21 of the apparatus main body 2 is opened, the handle 73 of the toner cartridge 7 is grasped, and the toner cartridge 7 is detached in the forward direction.

Then, when the process cartridge 5 is detached from the apparatus main body 2, the grip portion 130 of the process cartridge 5 is grasped, and the process cartridge 5 is pulled forward. Then, the process cartridge 5 moves along the mount guide 23 from the position of FIG. 11C to the position of FIG. 11B. Thereafter, the process cartridge 5 that has been moved to the position of FIG. 11B is detached in the forward direction (the position of FIG. 11A).

Figure 11B:
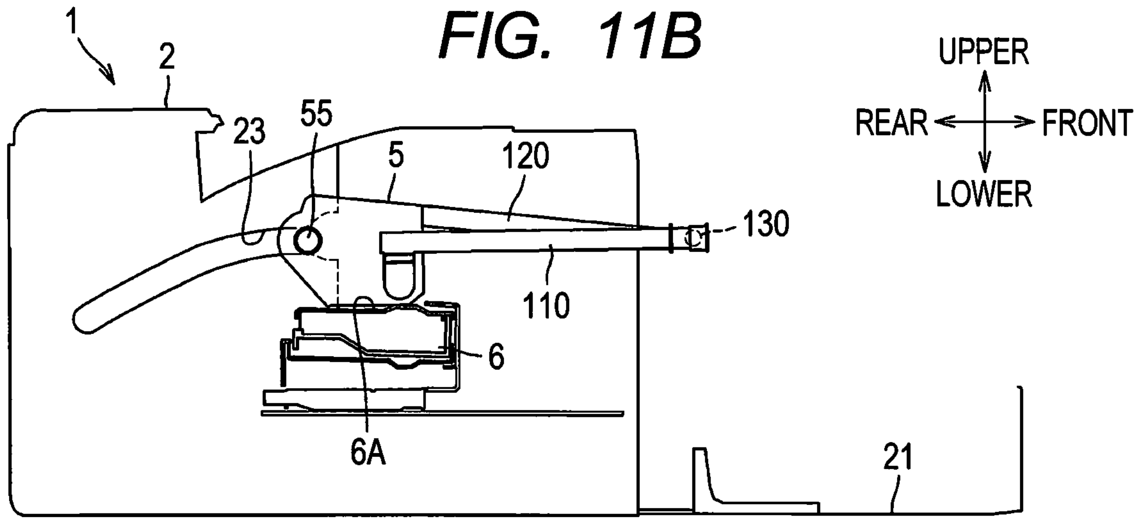
Figure 11C:
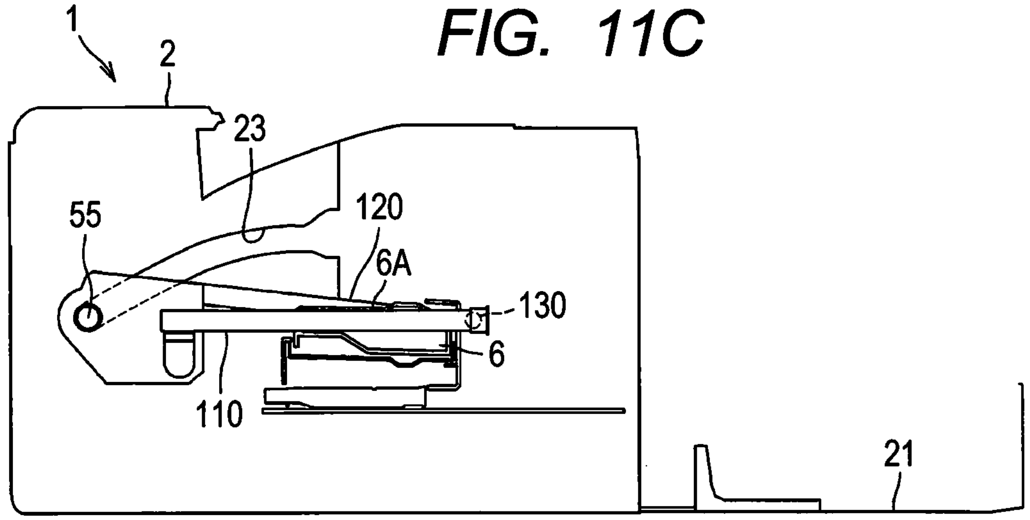

When the process cartridge 5 is mounted onto the apparatus main body 2, as shown in FIG. 11B, the process cartridge 5 is first placed on the upper surface 6A of the scanner unit 6. Then, the upper surface 6A of the scanner unit 6 guides the protrusion portions 55 of the process cartridge 5 to the mount guide 23. Thereafter, by pushing the process cartridge 5 rearward, as shown in FIG. 11C, the process cartridge 5 is guided by the mount guide 23 and mounted at a mount position.

When the toner cartridge 7 is mounted to the apparatus main body 2, the toner cartridge 7 is first placed at a particular position (the position of FIG. 1). Then, as shown in FIG. 4A, the first reception portion 112 of the toner conveyance pipe 110 is connected to the first connection portion 74 of the toner cartridge 7. Then, the first hole 112A of the first reception portion 112 and the first discharge port 74A of the toner container 71 are opened, and thereby the first hole 112A and the first discharge port 74A communicate with each other.

At this time, as shown in FIG. 5A, the second discharge portion 123 of the waste-toner conveyance pipe 120 is connected to the second connection portion 75 of the toner cartridge 7. Then, the second hole 123A of the second discharge portion 123 and the second discharge port 75A of the waste-toner container 72 are opened, and thereby the second hole 123A and the second discharge port 75A communicate with each other.

According to the above-described embodiment, the following effects are obtained.

In the image forming apparatus 1, the photosensitive drum 51, the scanner unit 6, and the toner cartridge 7 are aligned in this order in the front-rear direction. Thus, a space at the opposite side from the photosensitive drum 51 with respect to the scanner unit 6 is utilized as a space for arranging the toner cartridge 7. With this configuration, the capacity (volume) of the toner cartridge 7 is increased while suppressing the height of the image forming apparatus 1.

The process cartridge 5 includes the toner conveyance pipe 110. Thus, although the development unit 10 and the toner cartridge 7 are located away from each other, the toner is supplied through the toner conveyance pipe 110 from the toner cartridge 7 to the development unit 10. Therefore, the toner cartridge 7 can be arranged at the opposite side from the photosensitive drum 51 with respect to the scanner unit 6.

The toner conveyance pipe 110 overlaps the scanner unit 6 as viewed from the left-right direction, and thus an increase in the size of the image forming apparatus 1 in the vertical direction can be suppressed.

The toner cartridge 7 integrally includes the waste-toner container 72 that stores waste toner. Thus, by replacing the toner cartridge 7, the waste-toner container 72 that is integrally provided is also replaced. Hence, a user can omit time and effort for replacing the waste-toner container 72.

The waste-toner conveyance pipe 120 is provided. Thus, although the drum cleaner 53 and the waste-toner container 72 are located away from each other, waste toner can be moved through the waste-toner conveyance pipe 120 from the drum cleaner 53 to the waste-toner container 72. Hence, the flexibility of the design of the image forming apparatus 1 is enhanced.

The waste-toner conveyance pipe 120 overlaps the scanner unit 6 as viewed from the left-right direction. Thus, an increase in the size of the image forming apparatus 1 in the vertical direction can be suppressed.

The process cartridge 5 includes the grip portion 130 that is fixed to the end portion of the toner conveyance pipe 110 and the end portion of the waste-toner conveyance pipe 120. Thus, by using the grip portion 130, the process cartridge 5 is easily mounted and detached. The grip portion 130 also couples the toner conveyance pipe 110 and the waste-toner conveyance pipe 120 together, and thus the toner conveyance pipe 110 and the waste-toner conveyance pipe 120 are reinforced.

When the process cartridge 5 (the process unit) is mounted onto or detached from the apparatus main body 2, the operation of mounting or detaching the process cartridge 5 is guided by the upper surface 6A of the scanner unit 6. Thus, the process cartridge 5 is easily mounted and detached.

The seal member 19 having elasticity is arranged between the reception port 18 of the development unit 10 and the supply port 113A of the toner conveyance pipe 110. Thus, even when the development unit 10 swingably moves, the leakage of toner from between the reception port 18 and the supply port 113A is suppressed. Further, the seal member 19 is arranged in a compressed state. Thus, even when the development unit 10 swingably moves, a gap is unlikely to be produced, and the leakage of toner is suppressed.

While the disclosure has been described in detail with reference to the above aspects thereof, it would be apparent to those skilled in the art that various changes and modifications may be made therein without departing from the scope of the claims. Examples are provided below.

In the above-described embodiment, the toner container 71 and the waste-toner container 72 are formed integrally. Alternatively, a toner container and a waste-toner container may be formed in a detachable configuration, or may be formed separately.

In the above-described embodiment, this disclosure is applied to the image forming apparatus 1 such as a monochromatic laser printer. This disclosure is not limited to this, and may be applied to a color printer and other image forming apparatuses such as a copier and a multifunction peripheral (MFP), for example.

Further, each element described in the above-described embodiment and modifications may be combined arbitrarily.

What is claimed is:

1. An image forming apparatus comprising:

a process cartridge comprising:

a first side frame and a second side frame being apart from the first side frame in a first direction;

a photosensitive drum rotatable about a drum axis extending in the first direction, the photosensitive drum being rotatably supported between the first side frame and the second side frame;

a grip portion extending in the first direction;

a first connector extending in a second direction being perpendicular to the first direction, the first connector connecting the first side frame and a first end portion of the grip portion; and a second connector extending in the second direction, the second connector connecting the second side frame and a second end portion of the grip portion; and a scanner unit configured to expose the photosensitive drum to light, the scanner unit located between the photosensitive drum and the grip portion as viewed in a third direction which is perpendicular to the first direction and the second direction.

2. The image forming apparatus according to claim 1, wherein the photosensitive drum, the grip portion and the scanner unit overlap as viewed in the second direction.

3. The image forming apparatus according to claim 1, wherein the scanner unit is located between the first connector and the second connector as viewed in the third direction.

4. The image forming apparatus according to claim 3, wherein the scanner unit, the first connector and the second connector overlap as viewed in the first direction.

5. The image forming apparatus according to claim 1, further comprising a toner cartridge storing toner;

wherein the first connector comprises a toner conveyance pipe configured to convey toner from the toner cartridge to the process cartridge.

6. The image forming apparatus according to claim 1, further comprising a toner cartridge storing toner;

wherein the second connector comprises a waste-toner conveyance pipe configured to convey waste toner from the process cartridge to the toner cartridge.

7. An image forming apparatus comprising:

a toner cartridge storing toner;

a process cartridge comprising:

a first side frame and a second side frame being apart from the first side frame in a first direction;

a photosensitive drum rotatable about a drum axis extending in the first direction, the photosensitive drum being rotatably supported between the first side frame and the second side frame;

a first connector extending in a second direction being perpendicular to the first direction, the first connector connecting the first side frame and a first end portion of the toner cartridge; and a second connector extending in the second direction, the second connector connecting the second side frame and a second end portion of the toner cartridge; and a scanner unit configured to expose the photosensitive drum to light, the scanner unit located between the first connector and the second connector as viewed in a third direction which is perpendicular to the first direction and the second direction.

8. The image forming apparatus according to claim 7, wherein the first connector, the second connector and the scanner unit overlap as viewed in the first direction.

9. The image forming apparatus according to claim 7, wherein the process cartridge further comprises a grip portion extending in the first direction; and wherein the scanner unit is located between the photosensitive drum and the grip portion as viewed in the third direction.

10. The image forming apparatus according to claim 7, wherein the scanner unit, the photosensitive drum, and the grip portion overlap as viewed in the second direction.

11. The image forming apparatus according to claim 7, wherein the first connector comprises a toner conveyance pipe configured to convey toner from the toner cartridge to the process cartridge.

12. The image forming apparatus according to claim 7, wherein the second connector comprises a waste-toner conveyance pipe configured to convey waste toner from the process cartridge to the toner cartridge.

* * * * *